(12) United States Patent
Florkey et al.

(10) Patent No.: US 7,272,398 B2
(45) Date of Patent: Sep. 18, 2007

(54) PROVIDING TO SENDER OF MESSAGE AN IDENTIFIER OF SERVICE PROVIDER ASSOCIATED WITH RECIPIENT OF THE MESSAGE

(75) Inventors: Cynthia Kae Florkey, Chicago, IL (US); Ruth Schaefer Gayde, Naperville, IL (US); John Richard Rosenberg, Elmhurst, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 390 days.

(21) Appl. No.: 10/719,869

(22) Filed: Nov. 21, 2003

(65) Prior Publication Data

US 2005/0113083 A1    May 26, 2005

(51) Int. Cl.
*H04Q 7/20* (2006.01)

(52) U.S. Cl. .................. 455/445; 455/417; 455/424; 370/395.5; 370/467; 379/373.02

(58) Field of Classification Search ............... 455/445, 455/417, 426.1, 422.1, 466, 424; 370/395.5, 370/467, 352; 709/220, 229, 207; 358/1.15; 379/373.02

See application file for complete search history.

(56) References Cited

U.S. PATENT DOCUMENTS

| | | | |
|---|---|---|---|
| 5,572,579 A | 11/1996 | Orriss et al. | |
| 6,373,926 B1 | 4/2002 | Foladare et al. | |
| 6,507,589 B1* | 1/2003 | Ramasubramani et al. | 370/465 |
| 6,643,291 B1* | 11/2003 | Yoshihara et al. | 370/395.5 |
| 6,819,932 B2* | 11/2004 | Allison et al. | 455/466 |
| 6,952,428 B1* | 10/2005 | Necka et al. | 370/466 |
| 2002/0007421 A1 | 1/2002 | Dixon et al. | |
| 2002/0137507 A1* | 9/2002 | Winkler | 455/426 |
| 2002/0181694 A1* | 12/2002 | Mani | 379/373.02 |
| 2002/0191596 A1* | 12/2002 | Moyano et al. | 370/352 |
| 2003/0193967 A1* | 10/2003 | Fenton et al. | 370/490 |
| 2003/0231338 A1* | 12/2003 | Haga | 358/1.15 |
| 2004/0117451 A1* | 6/2004 | Chung | 709/207 |
| 2004/0121818 A1* | 6/2004 | Paakkonen | 455/567 |
| 2005/0058260 A1* | 3/2005 | Lasensky et al. | 379/1.03 |

FOREIGN PATENT DOCUMENTS

| | | |
|---|---|---|
| EP | 0 855 821 | 7/1998 |
| WO | WO 01/67268 | 9/2001 |

OTHER PUBLICATIONS

WIKIPEDIA; Short Message Service; http:en.wikipedia.org/wiki/SMS; 2 pgs.; US; Oct. 13, 2003.
Cell Phones/Pagers; What is SMS Text Messages? http://cellphones.about.com/library/glossary/bldef_sms_text_messages.htm; 1 pg.; US; Oct. 14, 2003.
Cell Phones/Pagers; How to Type and Send SMS Messages http://cellphones.about.com/library/glossary/bldef_sms_text_messages.htm; 2 pgs.; US; Oct. 14, 2003.

(Continued)

*Primary Examiner*—Danh Le

(57) ABSTRACT

An apparatus in one example comprises a gateway component that provides an identifier of a service provider to a sender of a message through employment of a user address associated with the recipient of the message.

8 Claims, 4 Drawing Sheets

OTHER PUBLICATIONS

EZmsg.com; SMS Text Messaging Gateway API; SMS Text Messaging Gateway; http://ezmsg.com/sms_text_messaging_gateway_api.htm; 1 pg.; US; Oct. 14, 2003.

EZmsg.com; Free Text Messaging Has Real Advantage; http://ezmsg.com/benefits_of_free_sms_text_messaging.htm; 1 pg.; US; Oct. 14, 2003.

EZmsg.com; Our Text Messaging is Cool, Fun and Free; http://ezmsg.com/about_our_free_sms_text_messaging.htm; 1 pg.; US; Oct. 14, 2003.

"IS-41"; http://www.techweb.com/encyclopedia.defineterm?term=IS-41; TechEncyclopedia; Computer Language Company, 5521 State Park Road, Point Pleasant, PA 18950; 1 pg.; 10/22/0.

"GATEWAY"; http://www.techweb.com/encyclopedia.defineterm?term=gateway; TechEncyclopedia; Computer Language Company, 5521 State Park Road, Point Pleasant, PA 18950; 2 pgs.

ZTANGO; http://www.ztango.com/; 11600 Sunrise Valley Drive, Suite 440, Reston, VA; US; 20191; 1 pg.; Oct. 13, 2003.

ZTANGO; Overview; http://www.ztango.com/company/index.html; 11600 Sunrise Valley Drive, Suite 440, Reston, VA; US; 20191; 2 pgs.; Oct. 13, 2003.

Mobile Spring; Wireless Instant Messaging (IM) with IMconnect; http://www.mobilespring.com/products/imconnect.jsp; 120 W. 44th St.; NY, NY 10036; 2 pgs.; US; Oct. 13, 2003.

Mobile Spring; Global Messaging with Metcalf; http://www.mobilespring.com/products/metcalf.jsp; 120 W. 44th S.; NY, NY 10036; 1 pg.; US; Oct. 13, 2003.

Mobile Spring; Products Overview; http://www.mobilespring.com/products/index.jsp; 120 W. 44th St.; NY, NY 10036; 2 pgs.; US; Oct. 13, 2003.

Mobile Spring; Access to New Services with Application Gateway; http://www.mobilespring.com/products/index.jsp; 120 W. 44th St.; NY, NY 10036; 2 pgs.; US; Oct. 13, 2003.

Inphomatch; The SMS Revolution; http://www.inphomatch.com/index.html; InphoMatch, Inc., 4511 Singer Court, Chantilly, VA 20152; 2 pgs.; US; Oct. 13, 2003.

Inphomatch; InphoManager; http://www.inphomatch.com/infomanager.html; InphoMatch, Inc., 4511 Singer Court, Chantilly, VA 20152; 2 pgs.; US; Oct. 13, 2003.

Inphomatch; InphoXchange; http://www.inphomatch.com/inphoxchange.html; InphoMatch, Inc., 4511 Singer Court, Chantilly, VA 20152; 2 pgs.; US; Oct. 13, 2003.

Inphomatch; InphoXchange Global; http://www.inphomatch.com/inphoglobal.html; InphoMatch, Inc., 4511 Singer Court, Chantilly, VA 20152; 2 pgs.; US; Oct. 13, 2003.

Inphomatch; InphoXchange; 4511 Singer Court, Chantilly, VA 20152; 2 pgs.; US; Oct. 13, 2003.

Inphomatch; InphoAccess; http://www.inphomatch.com/inphoaccess.html; InphoMatch, Inc., 4511 Singer Court, Chantilly, VA 20152; 2 pgs.; US; Oct. 13, 2003.

Inphomatch; InphoAccess; 4511 Singer Court, Chantilly, VA 20152; 2 pgs.; US; Oct. 13, 2003.

Inphomatch; Press Releases; http://www.inphomatch.com/press/3_10_03.html; InphoMatch, Inc., 4511 Singer Court, Chantilly, VA 20152; 3 pgs.; US; Oct. 13, 2003.

* cited by examiner

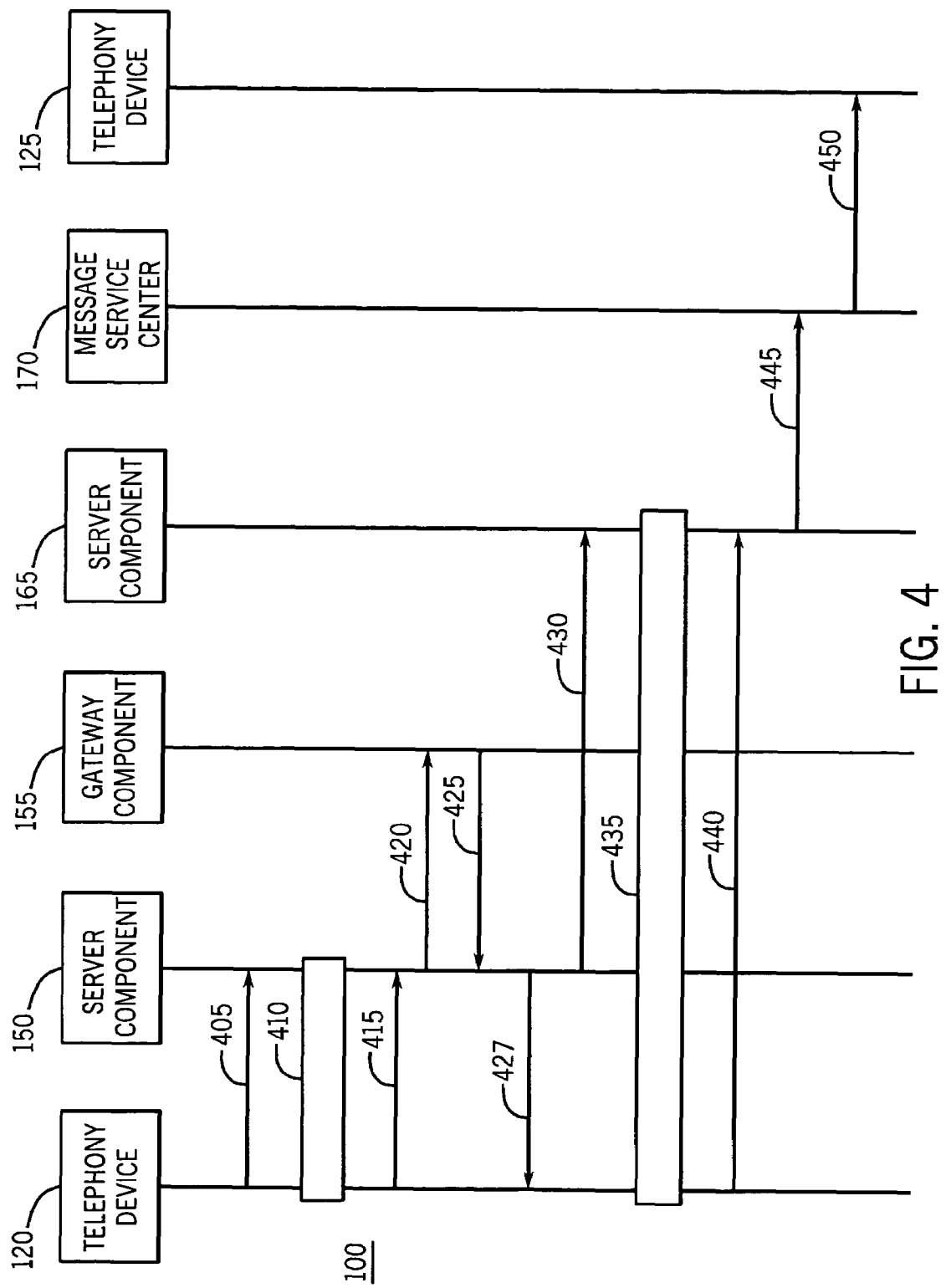

PROVIDING TO SENDER OF MESSAGE AN IDENTIFIER OF SERVICE PROVIDER ASSOCIATED WITH RECIPIENT OF THE MESSAGE

TECHNICAL FIELD

The invention relates generally to telecommunications and more particularly to messaging.

BACKGROUND

In order to provide for delivery of a message, for example, a text message, short message, and/or page, to a termination telephony device, a service provider associated with the recipient must be determined. For example, a sender of a message employs an initiation service provider to initiate the message to the recipient. Where the initiation service provider employed by the sender is not the service provider associated with the recipient, the initiation service provider automatically provides for delivery of the message to the service provider associated with the recipient. In order to provide for delivery of the message, the initiation service provider must determine the service provider associated with the recipient.

For example, InphoMatch (InphoMatch, Inc. 4511 Singer Court, Suite 300, Chantilly, Va. 20152, http://www.inphomatch.com) comprises a list of service providers and associated user addresses, such as a phone number and/or a Universal Resource Indicator ("URI"). Inphomatch employs the user address of a message to determine a service provider. Inphomatch automatically provides for delivery of the message to the service provider without interaction from the sender. Where the initiation server provider automatically delivers the message, the sender is restricted from interacting with any services (e.g., inserting animation, pictures, and/or voice) that are available for delivery of the message by the service provider associated with the recipient. As one shortcoming, the restriction from interacting with the services that are available for delivery of the message by the service provider associated with the recipient limits the services available to the sender for delivery of the message.

Thus, a need exists for providing an identifier of the service provider associated with the termination telephony device to the origination telephony device.

SUMMARY

The invention in one embodiment encompasses an apparatus. The apparatus comprises a gateway component that provides an identifier of a service provider to a sender of a message through employment of a user address associated with a recipient of the message.

Another embodiment of the invention encompasses a method. An identifier of a service provider is provided to a sender of a message through employment of a user address associated with a recipient of the message.

Yet another embodiment of the invention encompasses an article. The article comprises one or more computer-readable signal-bearing media. The article comprises means in the one or more media for providing an identifier associated with a service provider to a sender of a message through employment of a user address associated with a recipient of the message.

DESCRIPTION OF THE DRAWINGS

Features of exemplary implementations of the invention will become apparent from the description, the claims, and the accompanying drawings in which:

FIG. 4 is a representation of a third exemplary process flow of a message initiated from a web portal associated with a second telephony device by a first telephony device to the second telephony device of the one or more telephony devices of the apparatus of FIG. 1.

DETAILED DESCRIPTION

Figure 1:
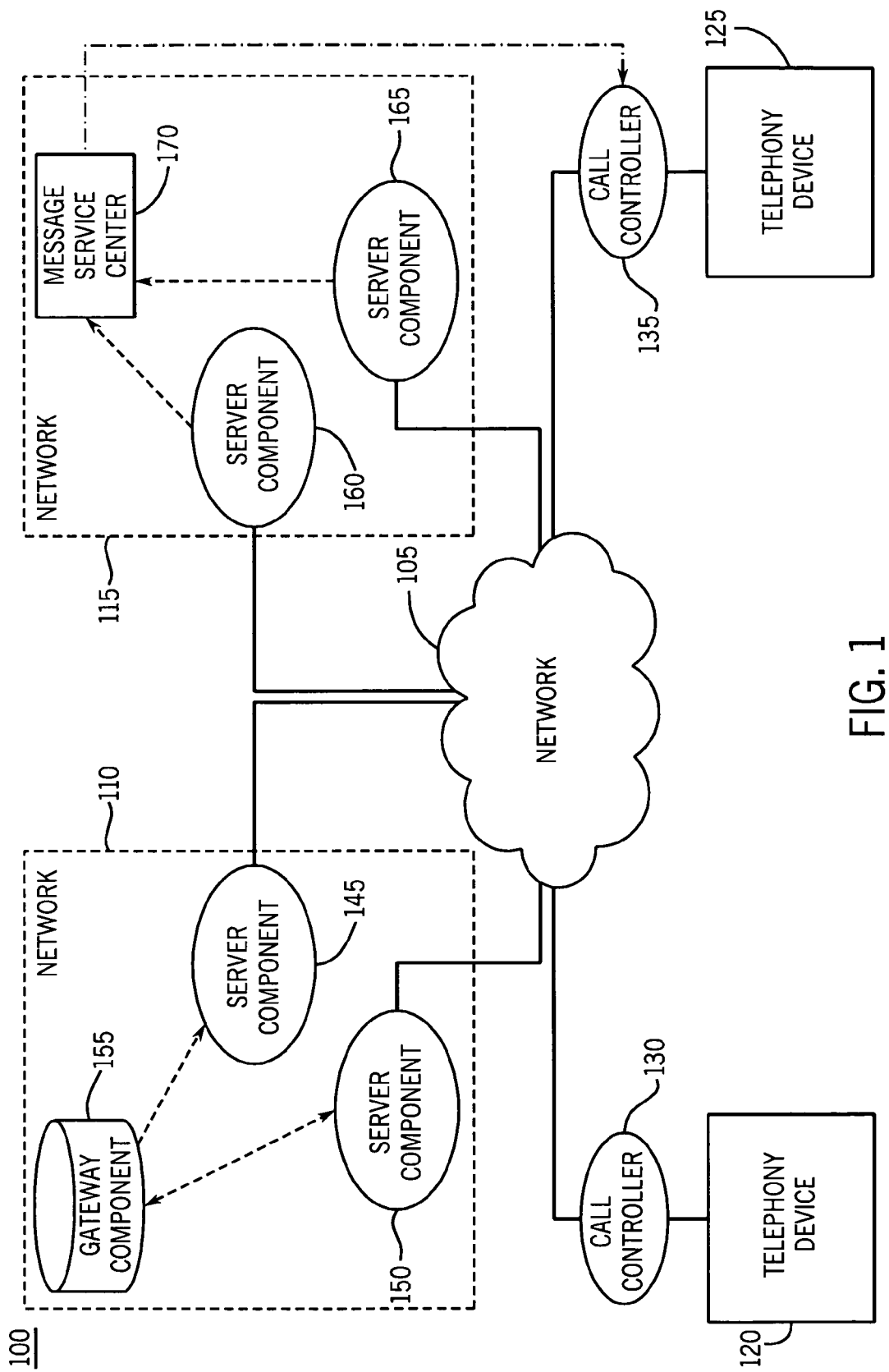
FIG. 1 is a representation of one exemplary implementation of an apparatus that comprises one or more networks, one or more telephony devices, one or more server components, one or more call controllers, one or more gateway components, and one or more message service centers.

Turning to FIG. 1, the apparatus 100 in one example comprises one or more networks 105, 110, and 115, and one or more telephony devices 120 and 125. In one example, the networks 105, 110, and/or 115 comprise one or more wireless networks. In yet another example, the networks 105, 110, and/or 115 comprise one or more wired networks, for example, a Public Switched Telephony Network ("PSTN"). In still another example, the networks 105, 110, and/or 115 comprise one or more wireless networks and one or more wired networks. The telephony devices 120 and/or 125 in one example comprise one or more Session Initiation Protocol ("SIP")-enabled devices, computers, landline phones, and/or wireless devices.

The network 105 in one example communicatively couples the networks 110 and 115. In another example, the network 105 communicatively couples the telephony devices 120 and 125. In yet another example, the network 105 communicatively couples the telephony device 120 and the network 110. In yet still another example, the network 105 communicatively couples the telephony device 125 and the network 115.

One or more service providers own and/or operate the networks 110 and/or 115. The networks 110 and/or 115 provide one or more services to the telephony devices 120 and/or 125. The networks 110 and/or 115 in one example comprise one or more server components 145, 150, 160, and 165, one or more gateway components 155, and one or more message service components 170. The server components 145, 150, 160, and/or 165 in one example comprise one or more email servers and/or web servers. In one example, the email servers terminate email messages. In another example, the email servers forward the email messages. The web servers in one example provide access to the Internet.

The gateway component 155 in one example comprises a database. In one example, the gateway component 155 includes the server component 145. In another example, the gateway component 155 includes the server component 150. In yet another example, the gateway component 155 includes the server component 145 and 150.

The message service center 170 in one example comprises a Short Message Service Center ("SMSC"). The message service center 170 in one example serves to store-and-forward messages. The message service center 170 in one example guarantees delivery of the messages by the networks 105, 110, and/or 115.

The telephony devices 120 and/or 125 in one example employ one or more call controllers 130 and 135 to initiate one or more messages on the networks 105, 110, and/or 115 to one of the other telephony devices 120 and/or 125. In one example, the call controllers 130 and/or 135 provide call logic and/or call signaling for the telephony devices 110 and/or 115. In another example, the call controllers 130 and/or 135 provide call logic, call signaling, and call switching.

The gateway component 155 provides an internet interface that is employable by a sender of a message to provide for an initiation of the message. The sender of the message in one example comprises a user of an origination telephony device, for example, the user of the telephony device 120. The user of the telephony device 120 in one example employs the internet interface to initiate a message to a recipient. The recipient in one example comprises a user of a termination telephony device, for example, the user of the telephony device 125. For example, the internet interface comprises a web portal. The gateway component 155 and a web server, for example, the server component 150, employ an Internet protocol, for example, the HyperText Transport Protocol ("HTTP") to establish the web portal with the origination telephony device, for example, the telephony device 120. The gateway component 155 in one example employs the internet interface to receive a user address from an origination telephony device, for example, the telephony device 120. The user address in one example comprises a directory number and/or a Universal Resource Indicator ("URI"), such as an email address and/or a Universal Resource Locator ("URL").

In one example, the gateway component 155 comprises a database component and a server, for example, the server component 150. The server component 150 provides the internet interface that is employable by a sender of a message to provide a user address associated with a recipient of a message. The server component 150 communicates with the database through employment of one or more database interfaces to obtain an identifier of a service provider associated with the user address. The database interfaces in one example comprise one or more industry standard architectures such as: Advanced Intelligent Network ("AIN"), Wireless Intelligent Network ("WIN"), Interim Standard-41 ("IS-41"), or Customized Application of Mobile Enhanced Logic ("CAMEL").

The gateway component 155 provides the internet interface that is employable by a user of the telephony device 120 to input a user address. The user address in one example is associated with a recipient of a message, for example, the user of the termination telephony device (e.g., the telephony device 125). The gateway component 155 in one example employs the user address to determine a service provider associated with a termination telephony device, for example, the telephony device 120.

Where a user address comprises a ported user address, the gateway component 155 obtains a Location Routing Number ("LRN") associated with the ported user address. In one example, the gateway component 155 communicates with a number portability database to obtain the Location Routing Number. The gateway component 155 employs the Location Routing Number to determine a service provider associated with a termination telephony device.

The gateway component 155 provides an identifier of a service provider to the sender of the message, for example, the user of the telephony device 110. The service provider in one example is associated with a recipient of a message, for example, the user of the telephony device 120. The identifier in one example comprises a logo, a web page, and/or a text description of a service provider associated with the termination telephony device, for example, the telephony device 120. The gateway component 155 provides the identifier of the service provider to the sender of the message through employment of the internet interface.

For example, a sender of a message interacts with a web portal provided by the gateway component 155 to obtain an identifier of a service provider associated with a user address. The sender of the message enters a user address, for example, myfriend@att.com, into the web portal. The sender of the message clicks a button on the web portal, for example, a "find service provider" button. The gateway component 155 receives the user address through employment of the internet interface and determines the service provider associated with the user address. The gateway component 155 provides the service provider to the sender through employment of the internet interface. For example, where a consumer group interacts with the web portal to obtain an identifier associated with a user address, the consumer group employs the identifier to provide targeted marketing to a user associated with the user address.

In one example, the gateway component 155 comprises a plurality of user addresses associated with a plurality of service providers. In one example, the gateway component 155 obtains the plurality of user addresses and the plurality of service providers from a data source. For example, the gateway component 155 obtains the plurality of user addresses and the plurality of service providers from an industry-standard data source such as the Local Exchange Routing Guide (LERG) maintained by Telcordia (Telcordia Technologies, Inc., One Telcordia Drive, Piscataway, N.J., 08854, http://www.telcordia.com). The gateway component 155 in one example determines the service provider through employment of one or more portions of the user address. For example, where each one of the plurality of service providers comprise respective blocks of user addresses, the gateway component 155 employs a first portion, such as an exchange, of the user address to determine the service provider, as will be understood by those skilled in the art.

The gateway component 155 in one example comprises a plurality of indications of a plurality of text-delivery networks associated with the plurality of service providers. A text-delivery network associated with a service provider in one example comprises a network for delivery of a message to a recipient. A text-delivery network in one example comprises the network 115. The gateway component 155 in one example routes the message to the text-delivery network to provide for delivery of the message to a recipient of the message, for example, the user of the telephony device 125. The gateway component 155 provides an indication of the text-delivery network to the sender of the message, for example, the user of the telephony device 120.

In one example, an indication of a text-delivery network comprises a Universal Resource Indicator ("URI"), such as an email address and/or a Universal Resource Locator ("URL"). The indication in one example is associated with a web portal of a service provider associated with the text-delivery network, for example, the service provider associated with the network 115. For example, the gateway component 155 provides a Universal Resource Locator to a sender of a message (e.g., the user of the telephony device 120) through employment of the internet interface. The gateway component 155 provides the Universal Resource Locator to a sender of a message to allow for an initiation of the message by the sender.

In another example, an indication of a text-delivery network comprises a web portal. The gateway component 155 in one example redirects a sender of a message (e.g., the user of the telephony device 120) to the web portal. The gateway component 155 redirects the sender to the web portal to allow for an initiation of a message from the web portal. The user of the telephony device 120 in one example enters text associated with a message through employment of the web portal. The user of the telephony device 120 selects to initiate the message from the web portal.

In yet another example, the gateway component 155 prompts the user of the telephony device 120 for text associated with a message. The gateway component 155 then communicates with the text-delivery network to provide for delivery of the message to the recipient. The gateway component 155 in one example provides the text associated with the message to a web portal associated with the text-delivery network. In one example, the gateway component 155 and an email server, for example, the server 145, cooperate to send an email to the text-delivery network. The email in one example comprises the text associated with the message. In another example, the gateway component 155 and an email server, for example, the server 145, cooperate to send a short message to the text-delivery network.

The text-delivery network in one example comprises a cellular network. The gateway component 155 employs one or more cellular networking protocols such as the American International Standards Institute-41 ("ANSI-41") protocol, the Global System for Mobile Communications ("GSM") Mobile Application Part ("MAP") protocol, and the Session Initiation Protocol ("SIP"), to communicate the text of the message to the text-delivery network. To provide for delivery of a message to a recipient on a cellular network, for example, the network 115, the gateway component 155 provides a cellular networking interface. The gateway component 155 employs the cellular networking interface to deliver the message to a text-delivery network associated with the termination telephony device, for example, the telephony device 125. For example, the gateway component 155 employs the cellular networking interface to communicate with the message service center 170.

In another example, the text-delivery network comprises a landline network. The gateway component 155 employs a landline protocol such as the Session Initiation Protocol ("SIP") to communicate the text of the message to the text-delivery network. To provide for delivery of a message to a recipient on a landline network, for example, the network 115, the gateway component 155 provides a landline interface. The gateway component 155 employs the landline interface to deliver the message to a text-delivery network associated with the termination telephony device, for example, the telephony device 125. For example, the gateway component 155 employs the landline interface to communicate with the message service center 170.

An illustrative description of exemplary operation of the apparatus 100 is presented, for explanatory purposes.

Figure 2:
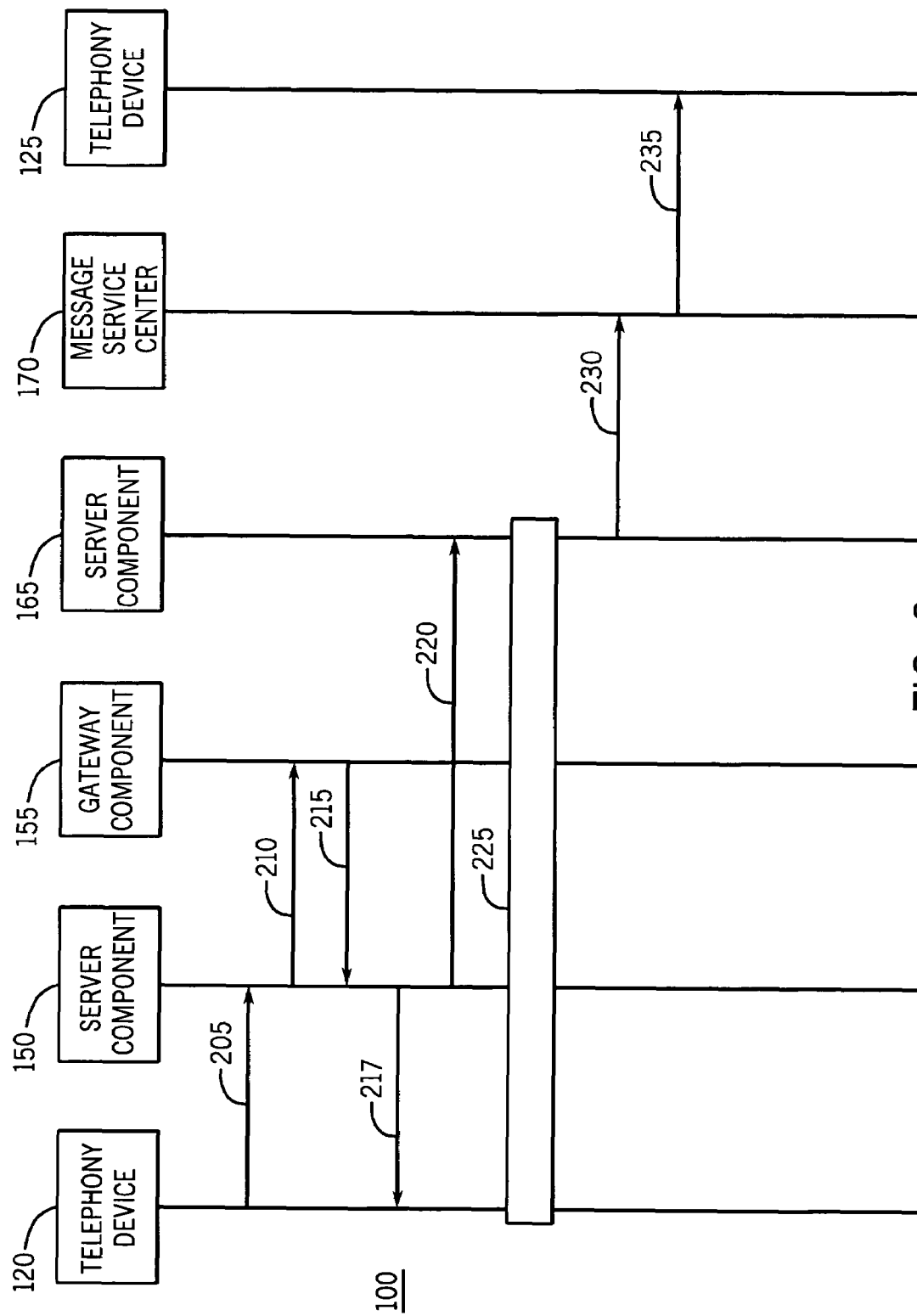
FIG. 2 is a representation of a first exemplary process flow of a message initiated from a web portal associated with a first telephony device to a second telephony device of the one or more telephony devices of the apparatus of FIG. 1.

Turning to FIG. 2, a sender of a message initiates the message to a recipient. In STEP 205, the user of the telephony device 120 accesses a web portal of a web server, for example, the server component 150, associated with a service provider of the network 110. The user of the telephony device 120 enters a user address associated with the recipient of the message and text associated with the message. The user of the telephony device 120 selects to initiate the message from the web portal.

In STEP 210, the server component 150 determines that the user address is not associated with the service provider of the network 110. The server component 150 communicates with the gateway component 155 to obtain a recipient service provider, for example, the service provider associated with the network 115. In STEP 215, the gateway component 155 determines the recipient service provider. The gateway component 155 determines a text-delivery network, for example, the network 115, associated with the recipient service provider. The gateway component 155 provides an indicator associated with the text-delivery network to the web server (e.g., the server component 150). The gateway component 155 provides an identifier associated with the recipient service provider to the server component 150. In STEP 217, the server component 150 provides the identifier, for example, a logo associated with the recipient service provider, to the user of the telephony device 120. The server component 150 provides the identifier to the user of the telephony device 120 through employment of the web portal.

In STEP 220, the web server, for example, the server component 150 employs the indicator of the text-delivery network to redirect the user of the telephony device 120 to a web portal of the recipient service provider. For example, the server component 150 establishes a communication with a recipient web server, for example, the server component 165 associated with the network 115. In STEP 225, the server components 150 and 165 provide the web portal of the recipient service provider to the user of the telephony device 120 through the internet interface. The user of the telephony device 125 views the text of the message and selects to initiate the message from the web portal of the recipient service provider.

In STEP 230, the server component 165 receives the message from the sender. The server component 165 routes the message to the message service center 170 to provide delivery of the message to the recipient, for example, the user of the telephony device 125. In STEP 235, the message service center 170 routes the message to the telephony device 125.

Figure 3:
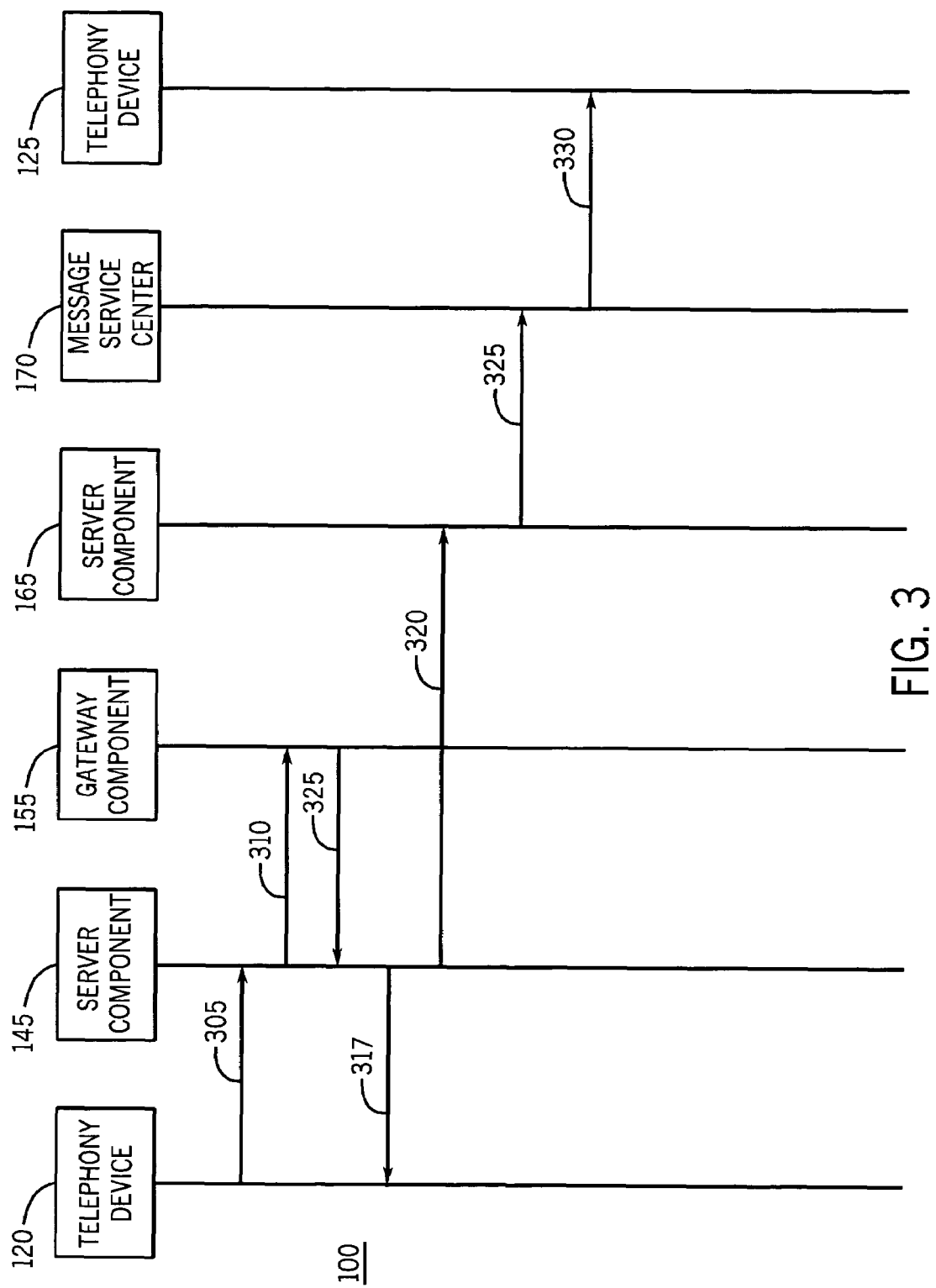
FIG. 3 is a representation of a second exemplary process flow of an email message from a first telephony device to a second telephony device of the one or more telephony devices of the apparatus of FIG. 1.

Turning to FIG. 3, the user of the telephony device 120 initiates a message to the user of the telephony device 125. In STEP 305, the user of the telephony device 120 employs the service provider associated with the network 110 to initiate an email message. The user of the telephony device 120 sends the email message to a user address. The email server, for example, the server component 145, associated with the network 110 receives the email. In STEP 310, the server component 145 determines that the user address is not associated with the service provider of the network 110. The server component 145 communicates with the gateway component 155 to obtain a recipient service provider, for example, a service provider associated with the user address.

The gateway component 155 determines the recipient service provider associated with the user address. The gateway component 155 determines a text-delivery network, for example, the network 115, associated with the recipient service provider. In STEP 315, the gateway component 155 provides an indication of the text-delivery network associated with the recipient service provider to the server component 145. The gateway component 155 provides an identifier associated with the recipient service provider to the server component 150. In STEP 317, the server component 145 provides the identifier, for example, a logo associated with the recipient service provider, to the user of the telephony device 120. The server component 145 provides the identifier to the user of the telephony device 120 within an email. In STEP 320, the server component 145 employs the indication of the text-delivery network, for example the network 115, to redirect the email message to a recipient email server, for example, the server component 160. In STEP 325, the server component 160 routes the email message to the message service center 170 to provide delivery of the email message. In STEP 330, the message service center 170 routes the message to the telephony device 125.

Turning to FIG. 4, the user of the telephony device 120 initiates a message to the user of the telephony device 125. In STEP 405, the user of the telephony device 120 and a web server, for example, the server component 150 establish a web portal through employment of the internet interface. In STEP 410, the user of the telephony device 105 views the web portal associated with the service provider of the network 110. The user of the telephony device 120 enters a user address of the user of the telephony device 125. In STEP 415, the user of the telephony device 120 in one example selects to initiate a search for a recipient service provider associated with the user address. For example, the user of the telephony device 120 clicks on a "find service provider" button provided by the web portal.

In STEP 420, the server component 150 communicates with the gateway component 155 to determine the recipient service provider associated with the user address. In STEP 425, the gateway component 155 determines the text-delivery network associated with the recipient service provider. The gateway component 155 provides an indicator of the text-delivery network to the server component 150. The gateway component 155 provides an identifier associated with the recipient service provider to the server component 150. In STEP 427, the server component 150 provides the identifier, for example, a logo associated with the recipient service provider, to the user of the telephony device 120 through employment of the web portal. In STEP 430, the server component 150 employs the indicator of the text-delivery network to establish a communication with the server component 165 of the recipient network, the network 115.

In STEP 435, the server components 150 and 165 cooperate to provide a web portal associated with the recipient service provider to the user of the telephony device 120. The user of the telephony device 120 views the web portal associated with the recipient service provider. In STEP 440, the user of the telephony device 120 enters text associated with the message and selects to initiate the message from the web portal of the recipient service provider.

In STEP 445, the server component 165 routes the message to the message service center 170 to provide delivery of the message to the recipient, for example, the user of the telephony device 125. In STEP 450, the message service center 170 routes the message to the telephony device 125.

The apparatus 100 in one example comprises a plurality of components such as computer software and/or hardware components. A number of such components can be combined or divided in the apparatus 100. An exemplary component of the apparatus 100 employs and/or comprises a set and/or series of computer instructions written in or implemented with any of a number of programming languages, as will be appreciated by those skilled in the art.

The apparatus 100 employs at least one computer-readable signal-bearing medium. One example of a computer-readable signal-bearing medium for the apparatus 100 comprises an instance of a recordable data storage medium such as one or more of a magnetic, electrical, optical, biological, and atomic data storage medium. The recordable data storage medium in one example comprises the storage device 101. In another example, a computer-readable signal-bearing medium for the apparatus 100 comprises a modulated carrier signal transmitted over a network comprising or coupled with the apparatus 100, for instance, one or more of a telephone network, a local area network ("LAN"), the internet, and a wireless network. An exemplary component of the apparatus 100 employs and/or comprises a set and/or series of computer instructions written in or implemented with any of a number of programming languages, as will be appreciated by those skilled in the art.

The steps or operations described herein are just exemplary. There may be many variations to these steps or operations without departing from the spirit of the invention. For instance, the steps may be performed in a differing order, or steps may be added, deleted, or modified.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

We claim:

1. An apparatus, comprising:
 a gateway component that provides an identifier of a service provider to a sender of a message through employment of a user address asociated with a recipient of the message;
 wherein the service provider is associated with the recipient of the message, and wherein the gateway component determines the identifier of the service provider associated with the recipient of the message through employment of the user address associated with the recipient; and
 wherein the gateway component determines an indication of a text-delivery network associated with the service provider, and wherein the gateway component provides the indication of the text-delivery network to the sender; and
 wherein the indication of the text-delivery network comprises an indication of a first web portal associated with the text-delivery network; and
 wherein the gateway component establishes a second web portal with the sender; and
 wherein the web portal allows for an initiation of the message by the sender through employment of the second web portal; and
 wherein the gateway component employs the indication of the first web portal to redirect the first web portal to the second web portal.

2. The apparatus of claim 1, wherein the indication of the text-delivery network comprises a Universal Resource Locator (URL) associated with the text-delivery network, and wherein the gateway component provides the Universal Resource Locator to the sender to allow for an initiation of the message by the sender.

3. The apparatus of claim 1, wherein the identifier comprises a logo associated with the service provider.

4. The apparatus of claim 1, wherein the identifier comprises a web page associated with the service provider.

5. The apparatus of claim 1, wherein the identifier comprises a text description associated with the service provider.

6. The apparatus of claim 1, wherein the user address comprises a directory number.

7. The apparatus of claim 1, wherein the user address comprises a Universal Resource Indicator (URI).

8. The apparatus of claim 1, wherein the user address comprises a directory number and a Universal Resource Indicator (URI).

* * * * *